(12) United States Patent
Ichinose et al.

(10) Patent No.: US 7,367,542 B2
(45) Date of Patent: May 6, 2008

(54) ELECTROMAGNETIC VALVE

(75) Inventors: Yuta Ichinose, Tokyo (JP); Yoshihiko Onishi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 681 days.

(21) Appl. No.: 10/421,761

(22) Filed: Apr. 24, 2003

(65) Prior Publication Data
US 2005/0051747 A1 Mar. 10, 2005

(30) Foreign Application Priority Data
Oct. 31, 2002 (JP) ............................. 2002-318447

(51) Int. Cl.
*F16K 31/06* (2006.01)
(52) U.S. Cl. ................................. 251/129.15
(58) Field of Classification Search ........... 251/129.15; 335/255, 257, 261, 262
See application file for complete search history.

(56) References Cited

U.S. PATENT DOCUMENTS

| | | | | |
|---|---|---|---|---|
| 3,851,285 A | * | 11/1974 | Rothfuss et al. | ............ 335/262 |
| 4,919,390 A | * | 4/1990 | Ichiryu et al. | ......... 251/129.15 |
| 5,685,519 A | * | 11/1997 | Bircann et al. | ........ 251/129.15 |
| 6,497,226 B2 | * | 12/2002 | Bircann et al. | ........ 123/568.11 |
| 6,644,622 B2 | * | 11/2003 | Modien | ................. 251/129.15 |
| 6,670,875 B2 | * | 12/2003 | Bircann et al. | ............. 335/220 |

FOREIGN PATENT DOCUMENTS

| | | |
|---|---|---|
| JP | 62-009768 U | 1/1987 |
| JP | 62-050383 U | 3/1987 |
| JP | 02-176283 A | 7/1990 |
| JP | 5-291030 A | 11/1993 |
| JP | 08-105566 A | 4/1996 |
| JP | 2000-136888 A | 5/2000 |
| JP | 2000-193120 A | 7/2000 |
| JP | 2001-82624 A | 3/2001 |
| JP | 2002-18874 A | 7/2002 |
| JP | 2002-260919 A | 9/2002 |

* cited by examiner

*Primary Examiner*—J. Casimer Jacyna
(74) *Attorney, Agent, or Firm*—Sughrue Mion, PLLC

(57) ABSTRACT

An electromagnetic valve with improved performance includes a solenoid coil 4, and a rod arranged on an axis of the solenoid coil 4 for movement in an axial direction thereof. A plunger 18 is fixedly attached to an intermediate portion of the rod. A core 6 is arranged at one side of the rod so as to surround it and operated to attract the plunger upon energization of the solenoid coil. A yoke 7 is arranged at the other side of the plunger so as to surround it. A pair of bearings 9a, 9b formed of a non-magnetic substance are arranged at opposite sides of the plunger, respectively, for movably supporting the rod at an outer peripheral surface thereof by clearance fit. The pair of bearings are clearance fitted to an inner peripheral surface of the core or to an inner peripheral surface of the yoke.

2 Claims, 3 Drawing Sheets

ELECTROMAGNETIC VALVE

BACKGROUND OF THE INVENTION

1. Field of the Invention

The present invention relates to an electromagnetic valve used to change the pressures of hydraulic operating fluid at respective operating portions of an electronic control automatic transmission for motor vehicles, for instance.

2. Description of the Related Art

In the past, for instance, a proportional electromagnetic (or solenoid) valve has been known which includes a solenoid coil, a rod arranged on an axis of the solenoid coil for movement in an axial direction thereof, a plunger attached to an intermediate portion of the rod, a core arranged at one side of the rod so as to surround it and operable to draw or attract the plunger upon energization of the solenoid coil, a yoke arranged at the other side of the plunger so as to surround it, and a pair of bearings arranged at opposite sides of the plunger, respectively, for movably supporting the rod. One of the bearings is press-fitted into the yoke, and the other bearing is press-fitted into the core (For instance, see a first document: Japanese patent application laid-open No. 2002-188744 (FIG. 2)).

In the proportional electromagnetic (or solenoid) valve as constructed above, the pair of bearings serve to support the rod for sliding movement in the axial direction thereof, with one of the bearings being press-fitted into the yoke and the other bearing being press-fitted into the core. With such an arrangement, the central axes of the bearings do not often accurately align with each other due to variations in machined or processed parts, variations in assembly thereof, etc., as a result of which diametral unbalanced loads act on the sliding portions of the bearings and the rod. Accordingly, there arises a problem in that the sliding resistance to the rod increases and hence it is impossible to obtain a prescribed degree of opening of the proportional electromagnetic valve with respect to an amount of electric current flowing through the solenoid coil.

In addition, in order to reduce the unbalanced loads, it is possible to increase gaps or clearances between the inner peripheral surfaces of the bearings and the outer peripheral surface of the rod, as a result of which, however, the central axes of the plunger, the core and the yoke might be displaced or misaligned with respect to one another to an increased extent. Therefore, the balance between the diametral magnetic force between the plunger and the core and the diametral magnetic force between the plunger and the yoke is broken so that there arises a problem similar to the above in that diametral unbalanced loads act on the sliding portions of the bearings and the rod due to a difference between of the above-mentioned diametral magnetic forces.

Moreover, there is a further problem in that foreign matters (metal powder, dust, etc.) might bite into the sliding portions between the inner peripheral surfaces of the bearings and the outer peripheral surface of the rod, thus making the rod inoperative.

SUMMARY OF THE INVENTION

The present invention is intended to obviate the problems as referred to above, and has for its object to provide an electromagnetic valve which has improved performance and can be prevented from being made inoperative due to the biting of foreign matters.

In order to achieve the above object, in an electromagnetic valve according to the present invention, at least one of a pair of bearings is clearance fitted to the inner peripheral surface of a core or to the inner peripheral surface of a yoke.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings. The same or equivalent members and parts are identified by the same symbols throughout the following description of the various preferred embodiments.

EMBODIMENT 1

Figure 1:
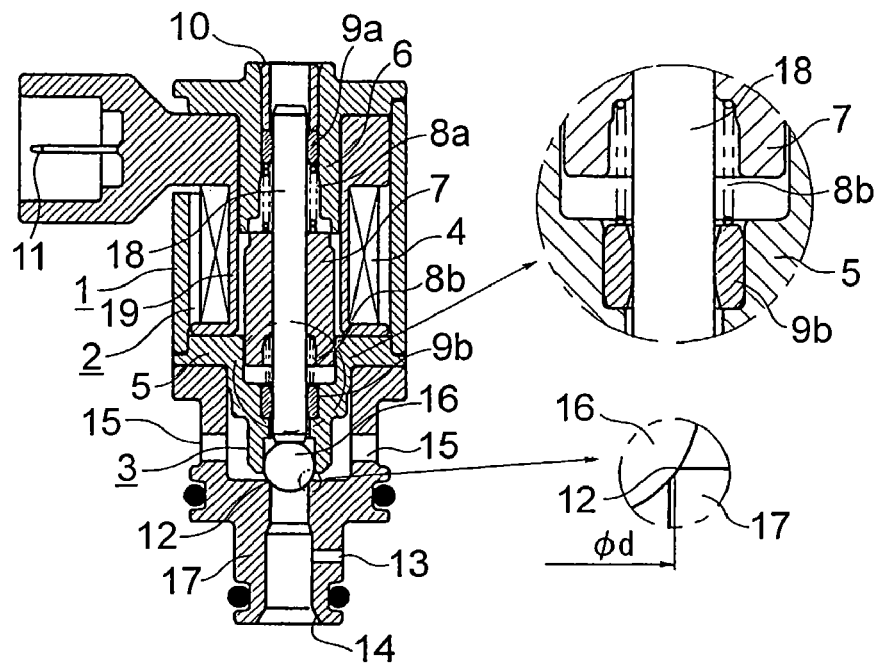
FIG. 1 is a cross sectional view of a proportional electromagnetic valve according to a first embodiment of the present invention.

FIG. 1 is a cross sectional view of a proportional electromagnetic (or solenoid) valve according to a first embodiment of the present invention.

The proportional electromagnetic valve illustrated is an electromagnetic valve of the normal high type (i.e., the output pressure is high when the valve is in a deenergized state, and decreases in accordance with an increasing current supplied thereto) used to change the pressure of hydraulic operating fluid at each operating part of an electronic control automatic transmission for motor vehicles. The proportional electromagnetic valve is provided with a casing 1 of a cylindrical shape, a solenoid device 2 arranged in the casing 1, and a valve device 3 which is operated by energization of the solenoid device 2.

The solenoid device 2 includes a solenoid coil 4 with a conducting wire wound around a bobbin 19, a yoke 5 fitted into an inner peripheral surface of the casing 1 at a lower portion thereof, a core 6 fitted into an inner peripheral surface of the bobbin 19 at an upper portion thereof, a plunger 7 arranged on a central axis of the solenoid coil 4 for movement therealong, a first spring 8a having its lower end portion placed in abutment with an upper end face of the plunger 7 to apply an urging force to the plunger 7, and a terminal 11 connected with the conducting wire of the solenoid coil 4.

The valve device 3 is provided with a spherical valve 16, a housing 17 fixedly secured to the yoke 5, and a rod 18 press-fitted into the plunger 7 to form an integral unit. The housing 17 is formed with a valve seat 12 that is in abutment with the valve 16, an inlet port 13 for hydraulic operating fluid, an outlet port 14 for the hydraulic operating fluid, and a discharge port 15 for the hydraulic operating fluid.

A first sliding bearing 9a is clearance fitted to an inner peripheral surface of the core 6 and an outer peripheral surface of the rod 18 at a location therebetween. The first spring 8a surrounding the rod 18 is in abutting engagement at an upper end portion thereof with a lower end face of the first sliding bearing 9a. A spring pin 10 of a C-shaped configuration is press-fitted into the inner peripheral surface of the core 6. A lower end portion of the spring pin 10 abuts against an upper end face of the first sliding bearing 9a. The load of the first spring 8a is controlled by adjusting the amount of press fit of the spring pin 10.

In addition, a second sliding bearing 9b is clearance fitted to the outer peripheral surface of the rod 18 and an inner peripheral surface of the yoke 5 at a location therebetween. A second spring 8b surrounding the rod 18 is in abutment at a lower end portion thereof with an upper end face of the second sliding bearing 9b, so that the second sliding bearing 9b is positively held in place by the compressive load of the second spring 8b.

The first sliding bearing 9a and the second sliding bearing 9b are configured such that they are tapered at the opposite ends thereof on the inner peripheral (i.e., diametrally or radially inner) surface side and on the outer peripheral (i.e., diametrally or radially outer) surface side thereof. Also, the first and second sliding bearings 9a, 9b are formed of non-magnetic and wear-resistant brass, but they may be formed of non-magnetic and wear-resistant phosphor bronze, or they may be formed of a sintered material.

The second bearing 9b is clearance fitted to the outer peripheral surface of the rod 18 and the inner peripheral surface of the yoke 5 at a location therebetween. The second bearing 9b is tiltable with respect to the axis of the rod 18 and slidable with respect to the rod 18.

Let us assume that a hysteresis error at an output pressure P (i.e., the pressure of hydraulic fluid in the automatic transmission at the outlet port 14) permitted to the proportional electromagnetic valve is $\Delta P$; a seat diameter decided by the valve 16 and the valve seat 12 is ød; a coefficient of dynamic friction between the second sliding bearing 9b and the rod 18 is $\mu$; and a coefficient decided by the coefficient of dynamic friction $\mu$ is C. Under these assumptions, a compressive load F of the second spring 8b to hold the second sliding bearing 9b in place is obtained by the following expression:

$$F = C \times \Delta P \times \pi (\text{ø}d)^2 / 4$$

When the coefficient of dynamic friction $\mu$ is equal to 0.1 ($\mu=0.1$), a possible range for coefficient C is $0<C\leq 3$, for instance, and hence the compressive load F of the second spring 8b is set to a value within a range corresponding to the value of the coefficient C.

Figure 2:
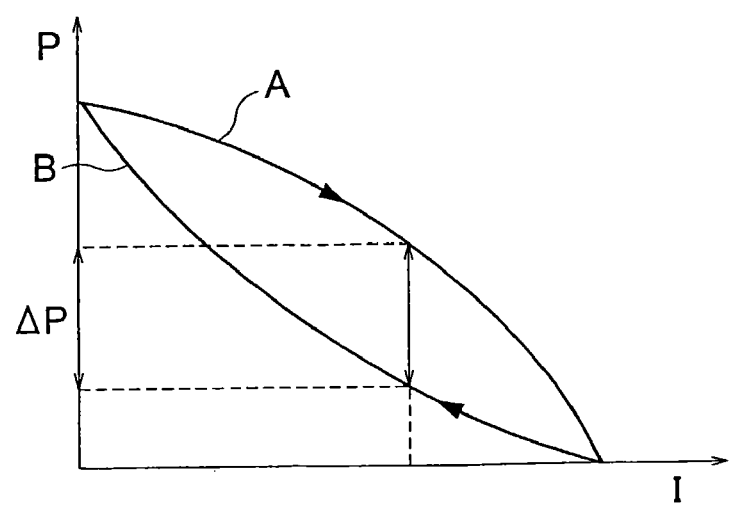
FIG. 2 is a relational chart of an electric current and an output pressure in the proportional electromagnetic valve of FIG. 1.

Incidentally, as shown in FIG. 2, in the relation between the value I of current flowing through the solenoid coil 4 and the output pressure P, a go direction output pressure curve A when the current value I rises from zero to a predetermined value and a return direction output pressure curve B when the current value I falls from the predetermined value to zero are different from each other, and hence the output pressures P on these pressure curves A and B even for the same current value I are different, thus resulting in a difference $\Delta P$ between the output pressures P, which is the hysteresis error $\Delta P$.

Here, note that the first sliding bearing 9a is also arranged between the outer peripheral surface of the rod 18 and the inner peripheral surface of the core 6 by means of a clearance fit, but the first spring 8a acting on this first sliding bearing 9a is arranged to adjust the output pressure P of the proportional electromagnetic valve, and hence the compressive load of the first spring 8a is very high as compared with the compressive load of the second spring 8b which serves to hold the second sliding bearing 9b. Therefore, it can be assumed that the first sliding bearing 9a is fixed to the core 6.

In the automatic transmission, the hydraulic fluid stored in an oil pan of an oil hydraulic circuit is sucked by an oil pump driven by an engine in synchronization therewith, so that it is pressure fed to an inlet port of each of electromagnetic valves after having been adjusted to a prescribed pressure by a regulator or the like.

In the proportional electromagnetic valve among these electromagnetic valves, the current value given to the solenoid coil 4 by the proportional electromagnetic valve is controlled by a signal from an automatic transmission control unit in accordance with the running state of a motor vehicle, thereby adjusting the force applied to the valve 16. As a result, the size of a gap or clearance between the valve 16 and the valve seat 12 is accordingly varied, so that hydraulic fluid flows from the inlet port 13 into the housing 17 at a constant input pressure. However, the amount of discharge of the hydraulic fluid from the discharge port 15 is determined according to the above-mentioned gap or clearance size. For instance, the outgoing flow rate of the hydraulic fluid from the outlet port 14 decreases in accordance with the increasing amount of discharge, and the output pressure P at the outlet port 14 decreases, too.

The opening and closing of each control valve installed in the oil hydraulic circuit of the automatic transmission is controlled by the output pressure P, thus changing the speed of the vehicle. The automatic transmission hydraulic fluid discharged from the discharge port 15 is collected into the oil pan in the oil hydraulic circuit in the automatic transmission.

Next, reference will be, made to the operation of the proportional electromagnetic valve of the normal high type as constructed above.

When the solenoid coil 4 is in a deenergized state, the rod 18 integral with the plunger 7 urges the valve 16 toward the valve seat 12 under the action of the compressive load of the first spring 8a which presses an end face of the plunger 7. The valve 16 is separated from the valve seat 12 in such a manner that the output pressure P of the hydraulic fluid flowing from the inlet port 13 to the outlet port 14 through the housing 17 becomes a pressure which balances with or is equal to a value obtained by dividing the thrust or pressing force of the valve 16 by an area of the valve seat 12 decided by a seat diameter ød thereof. As a consequence, the hydraulic fluid is discharged from the discharge port 15, and at this time, the output pressure P indicates a maximum.

When the solenoid coil 4 is energized, it generates a magnetic field so that lines of magnetic flux pass through the casing 1, the core 6, the plunger 7 and the yoke 5, which together form a magnetic circuit, whereby a magnetic attractive force proportional to the electric current supplied to the solenoid coil 4 is generated between the thus excited core 6 and the plunger 7 in the sliding direction of the rod 18. The magnetic attractive force is generated in a direction against the resilient force of the first spring 8a, thereby decreasing the thrust of the valve 16. For instance, the output pressure P of the hydraulic fluid flowing into the outlet port 14 is controlled by adjusting the thrust of the valve 16 according to the magnetic attractive force determined by the amount of electric power supplied to the solenoid coil 4. Specifically, when the current value supplied to the solenoid coil 4 is increased, the thrust of the valve 16 is decreased, thus reducing the output pressure P. At the time when the magnetic attractive force generated in the solenoid coil 4 becomes balanced with the thrust or urging force of the first spring 8a, the output pressure P indicates a minimum.

Thereafter, when the energization of the solenoid coil 4 is interrupted, the magnetic attractive force of the core 6 becomes zero whereby the plunger 7 is caused to move toward an anti-core side (i.e., in a direction away from the core 6) under the action of the resilient force of the first spring 8a. As a result, the rod 18 integral with the plunger 7 urges the valve 16 in such a manner that the valve 16 is seated on the valve seat 12, thus closing the proportional electromagnetic valve.

With the proportional electromagnetic valve as constructed above, the second sliding bearing 9b is clearance fitted to the outer peripheral surface of the rod 18 and the inner peripheral surface of the yoke 5 in such a manner that it is tiltable with respect to the axis of the rod 18 and slidable with respect to the rod 18. Therefore, an unbalanced load on the sliding portions of the second sliding bearing 9b and the rod 18 resulting from variations in machined or assembled parts or the like is alleviated by sliding or tilting motion of the second sliding bearing 9b relative to the yoke 5. Consequently, an increase in the hysteresis error ΔP due to the unbalanced load can be avoided, thus making it possible to reduce variation in the performance of the output pressures P among respective proportional control valves.

In addition, the machinability and assemblability of parts can be improved owing to the increased measurement allowance of the parts.

Moreover, even if the rod 18 is stuck or seized to the second sliding bearing 9b by the biting of foreign matters therebetween, the outer peripheral surface of the second sliding bearing 9b becomes a sliding surface for the inner peripheral surface of the yoke 5, and hence the rod 18 becomes movable together with the second sliding bearing 9b, thus making it possible to obtain a prescribed value of the output pressure P.

Further, the first sliding bearing 9a and the second sliding bearing 9b are configured such that they are tapered at opposite ends on the inner peripheral surface side and the outer peripheral surface side thereof. Thus, the second sliding bearing 9b can be tilted or inclined easily by an unbalanced load acting on the sliding portions of the second sliding bearing 9b and the rod 18, so that the sliding resistance of the rod 18 can be accordingly reduced.

EMBODIMENT 2

Figure 3:
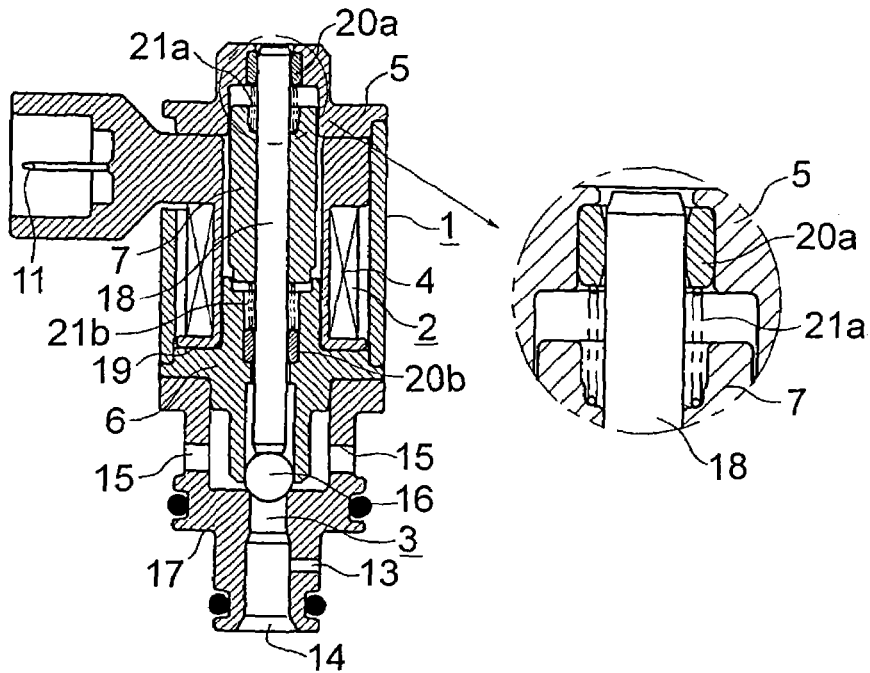
FIG. 3 is a cross sectional view of a proportional electromagnetic valve according to a second embodiment of the present invention.

FIG. 3 is a cross sectional view of a proportional electromagnetic valve according to a second embodiment of the present invention, and this proportional electromagnetic valve is of the type in which its output pressure is low when the valve is in a deenergized state, and increases in accordance with an increasing current supplied to the valve.

In comparison with the proportional electromagnetic valve of the normal high type according to the first embodiment, the proportional electromagnetic valve of the normal low type according to this second embodiment differs in that the arrangement of a core 6 and a yoke 5 of this embodiment is opposite to that of the first embodiment, and that the first spring 8a of the first embodiment for adjusting the output pressure P of the proportional electromagnetic valve is omitted.

Also, a first sliding bearing 20a is arranged between the outer peripheral surface of a rod 18 and the inner peripheral surface of the core 6 by means of a clearance fit. A first spring 21a surrounding the rod 18 is in abutting engagement at an upper end portion thereof with a lower end face of a first sliding bearing 20a, so that the first sliding bearing 20a is positively held at an end of the rod 18 by the resilient force of the first spring 21a.

In addition, a second sliding bearing 20b is also arranged between the outer peripheral surface of the rod 18 and the inner peripheral surface of the core 6 by means of a clearance fit. A second spring 21b surrounding the rod 18 is in abutment at a lower end portion thereof with an upper end face of the second sliding bearing 20b, so that the second sliding bearing 20b is positively held at an intermediate portion of the rod 18 by the resilient force of the second spring 21b.

The first sliding bearing 20a and the second sliding bearing 20b are configured such that they are tapered at the opposite ends thereof on the inner peripheral surface side and on the outer peripheral surface side thereof. Also, the first and second sliding bearings 20a, 20b are formed of non-magnetic and wear-resistant brass, but they may be formed of non-magnetic and wear-resistant phosphor bronze, or they may be formed of a sintered material.

The first sliding bearing 20a and the second sliding bearing 20b are clearance fitted to the outer peripheral surface of the rod 18 and the inner peripheral surface of the yoke 5 in such a manner that it is tiltable with respect to the axis of the rod 18 and slidable with respect to the rod 18.

With the proportional electromagnetic valve of the second embodiment, in its deenergized state, there is no force urging a valve 16 which is in abutment with the rod 18 integral with a plunger 7, and hence the hydraulic fluid flowing from an inlet port 13 to an outlet port 14 through the inside of a housing 17 pushes up the valve 16, so that it is discharged from a discharge port 15. At this time, the output pressure P indicates a minimum.

Subsequently, when a solenoid coil 4 is energized, it generates a magnetic field so that lines of magnetic flux pass through a casing 1, the core 6, the plunger 7 and the yoke 5, which together constitute a magnetic circuit, whereby a magnetic attractive force proportional to the electric current supplied to the solenoid coil 4 is generated between the thus excited core 6 and the plunger 7 in the sliding direction of the rod 18. The magnetic attractive force is generated in a direction to urge a valve seat 12 toward the valve 16. The output pressure P of the hydraulic fluid flowing into the outlet port 14 becomes a pressure which balances with or is equal to a value obtained by dividing the thrust or urging force of the valve 16 by an area of the valve seat 12 decided by a seat diameter ød thereof. For instance, the output pressure P of the hydraulic fluid flowing into the outlet port 14 is controlled by adjusting the thrust of the valve 16 according to the magnetic attractive force determined by the amount of electric power supplied to the solenoid coil 4. Specifically, when the current value supplied to the solenoid coil 4 is increased, the thrust of the valve 16 is increased, thus increasing the output pressure P. At the time when the magnetic attractive force generated in the solenoid coil 4 becomes balanced with the pressure at the inlet port 13, the output pressure P indicates a maximum.

Thereafter, when the energization of the solenoid coil 4 is interrupted, the magnetic attractive force of the core 6 becomes zero whereby the plunger 7 is caused to move toward an anti-core side (i.e., in a direction away from the core 6) under the action of the resilient force of the first spring 21a. As a result, the valve 16 is pushed up by the input pressure of the hydraulic fluid from the inlet port 13, whereby the valve 16 is held separated from the valve seat 12. Therefore, the hydraulic fluid from the inlet port 13 is discharged from the discharge port 15 through the inside of the housing 17, whereby the proportional electromagnetic valve is made into a fully opened state.

In the case of the proportional electromagnetic valve of this second embodiment, the first sliding bearing 20a held at one end of the rod 18 by means of the first spring 21a is clearance fitted to the outer peripheral surface of the rod 18 and the inner peripheral surface of the yoke 5, and the first sliding bearing 20a is tiltable with respect to the axis of the rod 18 and slidable with respect to the rod 18. Further, the second sliding bearing 20b held at the intermediate portion of the rod 18 by means of the second spring 21b is clearance fitted to the outer peripheral surface of the rod 18 and the inner peripheral surface of the core 6, and the second sliding bearing 20b is tiltable with respect to the axis of the rod 18 and slidable with respect to the rod 18.

With such an arrangement, an increase in the hysteresis error ΔP due to the unbalanced load can be avoided, thus making it possible to reduce variation in the performance of the output pressures P among respective proportional control valves.

In addition, the machinability and assemblability of parts can be improved owing to the increased measurement allowance of the parts.

Moreover, even when the rod 18 is stuck or seized to the first sliding bearing 20a and the second sliding bearing 20b by the biting of foreign matters therebetween, the rod 18 becomes movable together with the first sliding bearing 20a and the second sliding bearing 20b, thus making it possible to obtain a prescribed value of the output pressure P.

Further, the first sliding bearing 20a and the second sliding bearing 20b are configured such that they are tapered at opposite ends on the inner peripheral surface side and the outer peripheral surface side thereof. Therefore, the first sliding bearing 20a and the second sliding bearing 20b can be tilted or inclined easily by an unbalanced load acting on the sliding portions of the first and second sliding bearings 20a, 20b and the rod 18, so that the sliding resistance of the rod 18 can be accordingly reduced.

EMBODIMENT 3

Figure 4:
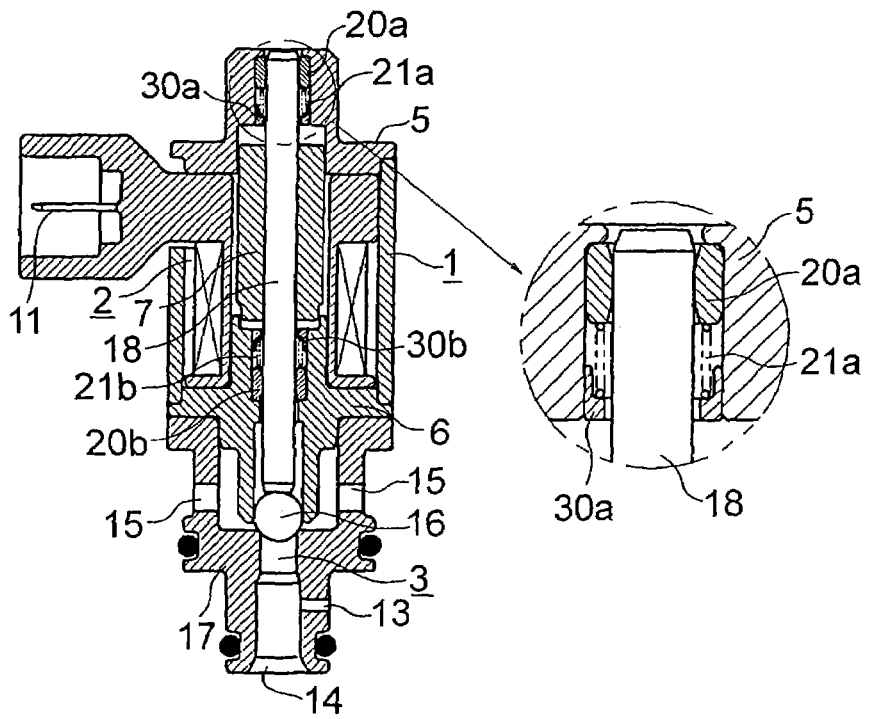
FIG. 4 is a cross sectional view of a proportional electromagnetic valve according to a third embodiment of the present invention.

FIG. 4 is a cross sectional view of a proportional electromagnetic valve according to a third embodiment of the present invention, and similar to the above-mentioned second embodiment, this proportional electromagnetic valve of this third embodiment is of the type in which its output pressure is zero when the valve is in a deenergized state, and increases in accordance with an increasing current supplied to the valve.

In this proportional electromagnetic valve of the normal low type, a first holder 30a, against which a lower end portion of a first spring 21a abuts, is fixedly secured to the inner peripheral surface of a yoke 5, and a second holder 30b, against which an upper end portion of a second spring 21b abuts, is fixedly secured to the inner peripheral surface of a core 6. Each of the first holder 30a and the second holder 30b is formed at their one end with an annular collar protruding in a radially inner direction, and the first spring 21a and the second spring 21b are in abutment at their one end with the collars of the first holder 30a and the second holder 30b, respectively.

The construction of this third embodiment other than the above is similar to that of the second embodiment.

In comparison with the first and second embodiments in which one ends of the springs 8b, 21a and 21b, which serve to hold the sliding bearings 9b, 20a and 20b, are in abutment with the plunger 7, the one ends of the springs 21a, 21b of this third embodiment are in abutment with the holders 30a, 30b, respectively, so that the loads of the springs 21a, 21b are received by the holder 30a, 30b, respectively, whereby they are prevented from being impressed on the rod 18 through the plunger 7, thus making it possible to provide a further stable output pressure characteristic.

Here, note that the operation and effect of this embodiment other than the above are similar to those of the second embodiment.

EMBODIMENT 4

Figure 5:
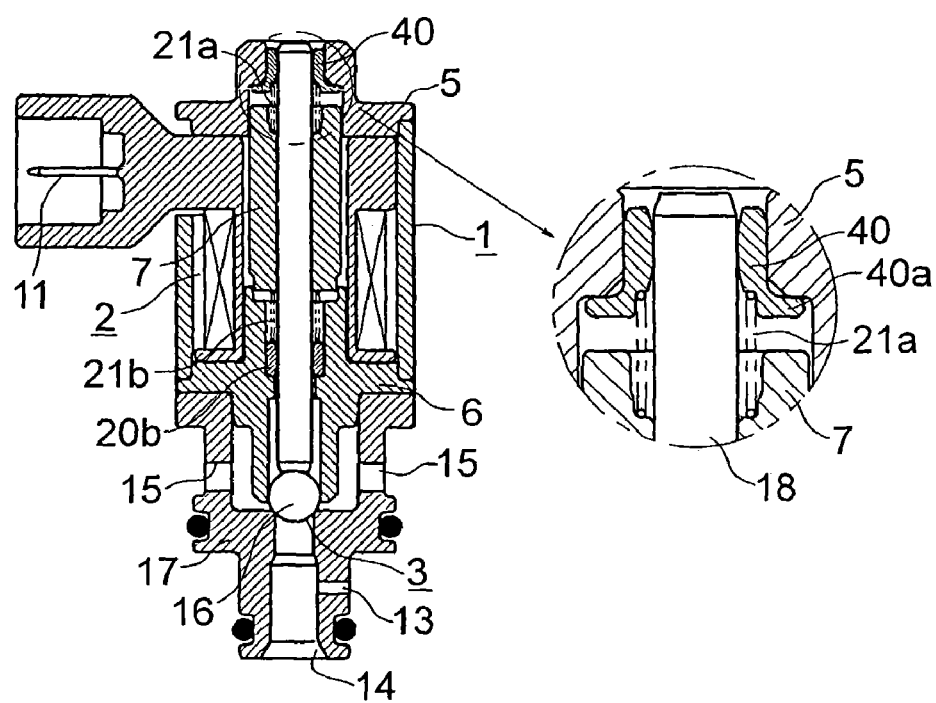
FIG. 5 is a cross sectional view of a proportional electromagnetic valve according to a fourth embodiment of the present invention.

FIG. 5 is a cross sectional view of a proportional electromagnetic valve according to a fourth embodiment of the present invention, and similar to the above-mentioned second embodiment, the proportional electromagnetic valve of this fourth embodiment is of the type in which its output pressure is zero when the valve is in a deenergized state, and increases in accordance with an increasing current supplied to the valve.

In this proportional electromagnetic valve of the normal low type, a first sliding bearing 40 is clearance fitted to the outer peripheral surface of a rod 18 and the inner peripheral surface of a yoke 5. The first sliding bearing 40 is formed at its one end with an annular collar 40a protruding in a radially outer direction, the collar 40a being arranged in opposition to an end face of a plunger 7.

The construction of this fourth embodiment other than the above is similar to that of the second embodiment.

Since this embodiment is provided with the first sliding bearing 40 having the collar 40a arranged in opposition to one end face of the plunger 7, it is possible to avoid a situation where the plunger 7 might be magnetically attracted to the yoke 5 due to an abnormal displacement thereof, thus causing a malfunction.

The operation and effect of this fourth embodiment other than this are similar to those of the second embodiment.

Although in the above-mentioned respective embodiments, the sliding bearings 9a, 9b, 20a, 20b and 40 of the clearance fit structure are arranged at the opposite ends of the rod 18 on the opposite sides of the plunger 7, they may be arranged only at either one of the opposite ends of the rod 18. In this case, in order to prevent malfunctions due to the biting of foreign matters between the sliding surfaces of the sliding bearings 9a, 9b, 20a, 20b, 40 and the rod 18, it is rather effective to provide the clearance fit structure to the sliding bearings 9b, 20b arranged at the valve 16 side at which foreign matters are apt to invade.

In addition, although in the above-mentioned respective embodiments, reference has been made to the case where sliding bearings 9a, 9b, 20a, 20b and 40, which are of rather simple constructions as bearings, are used, the present invention is of course applicable to rolling bearings, too.

Moreover, although the sliding bearings 9a, 9b, 20a and 20b are configured such that they are tapered at opposite ends at the inner peripheral surface side and the outer peripheral surface side thereof, they may be tapered only at either one of their inner and outer peripheral surface sides.

Further, although in the above-mentioned respective embodiments, reference has been made to the case where a proportional electromagnetic valve is used as an electromagnetic valve in an oil hydraulic circuit of an electronic control automatic transmission for motor vehicles for changing hydraulic fluid pressures at respective operating portions of the automatic transmission, the present invention is not limited to this but applicable to electromagnetic valves employed in a variety of kinds of machines.

As described above, according to an electromagnetic valve of the present invention, at least one of a pair of bearings is clearance fitted to the inner peripheral surface of a core or to the inner peripheral surface of a yoke, and hence it is possible to improve the performance of the electromagnetic valve as well as prevent malfunctions thereof due to the biting of foreign matters.

While the invention has been described in terms of preferred embodiments, those skilled in the art will recognize that the invention can be practiced with modifications within the spirit and scope of the appended claims.

What is claimed is:

1. An electromagnetic valve comprising:
   a solenoid coil;
   a rod arranged on an axis of said solenoid coil for movement in an axial direction thereof;
   a plunger fixedly attached to an intermediate portion of said rod;
   a core arranged at one side of said rod so as to surround it and operable to attract said plunger upon energization of said solenoid coil;
   a yoke arranged at the other side of said plunger so as to surround it;
   a pair of bearings formed of a non-magnetic substance and arranged at opposite sides of said plunger, respectively, for movably supporting said rod at an outer peripheral surface thereof by clearance fit, at least one of said pair of bearings being configured to permit tilting with respect to an axis of said rod;
   wherein at least one of said pair of bearings is clearance fitted to an inner peripheral surface of said core or to an inner peripheral surface of said yoke;
   a spring arranged between said plunger and one of said bearings which is attached to the inner peripheral surface of said core or to the inner peripheral surface of said yoke by clearance fit, said bearings being held in place by a resilient force of said spring; and
   a holder arranged between said spring and said plunger for preventing a load of said spring from being applied to said plunger,
   wherein a lower end portion of said spring abuts said holder and wherein said holder is fixedly secured to said inner peripheral surface of said yoke.

2. An electromagnetic valve comprising:
   a solenoid coil;
   a rod arranged on an axis of said solenoid coil for movement in an axial direction thereof;
   a plunger fixedly attached to an intermediate portion of said rod;
   a core arranged at one side of said rod so as to surround it and operable to attract said plunger upon energization of said solenoid coil;
   a yoke arranged at the other side of said plunger so as to surround it;
   a pair of bearings formed of a non-magnetic substance and arranged at opposite sides of said plunger, respectively, for movably supporting said rod at an outer peripheral surface thereof by clearance fit, at least one of said pair of bearings being configured to permit tilting with respect to an axis of said rod;
   wherein at least one of said pair of bearings is clearance fitted to an inner peripheral surface of said core or to an inner peripheral surface of said yoke,
   a collar formed at one end of each of said bearings and extending in a radial direction of said rod at a location between said yoke and one end of said plunger for preventing said plunger from being attracted to said yoke under the action of a magnetic force; and
   a spring arranged between said plunger and one of said bearings, wherein said spring abuts the collar formed at one end of one of said bearings.

* * * * *